April 25, 1961

C. H. GIBSON

2,981,395

OPERATOR MECHANISM FOR THE CONTROL OF THE AUTOMATIC OPERATION
OF A SERIES OF SUCCESSIVE INDIVIDUALLY SELECTED OPERATIONAL
STEPS IN BUSINESS, CALCULATING AND SIMILAR MACHINES

Filed July 9, 1957

Charles H. Gibson
INVENTOR.

BY Clarence A. O'Brien
and Harvey B. Jacobson
Attorneys

April 25, 1961

C. H. GIBSON 2,981,395

OPERATOR MECHANISM FOR THE CONTROL OF THE AUTOMATIC OPERATION
OF A SERIES OF SUCCESSIVE INDIVIDUALLY SELECTED OPERATIONAL
STEPS IN BUSINESS, CALCULATING AND SIMILAR MACHINES

Filed July 9, 1957

Charles H. Gibson
INVENTOR.

BY *Clarence A. O'Brien
and Harvey B. Jacobson*
Attorneys

April 25, 1961

C. H. GIBSON

2,981,395

OPERATOR MECHANISM FOR THE CONTROL OF THE AUTOMATIC OPERATION
OF A SERIES OF SUCCESSIVE INDIVIDUALLY SELECTED OPERATIONAL
STEPS IN BUSINESS, CALCULATING AND SIMILAR MACHINES

Filed July 9, 1957

Charles H. Gibson
INVENTOR.

BY Clarence A. O'Brien
and Harvey B. Jacobson
Attorneys

April 25, 1961

C. H. GIBSON 2,981,395

OPERATOR MECHANISM FOR THE CONTROL OF THE AUTOMATIC OPERATION
OF A SERIES OF SUCCESSIVE INDIVIDUALLY SELECTED OPERATIONAL
STEPS IN BUSINESS, CALCULATING AND SIMILAR MACHINES

Filed July 9, 1957

Charles H. Gibson
INVENTOR.

BY Clarence A. O'Brien
and Harvey B. Jacobson
Attorneys

2,981,395

OPERATOR MECHANISM FOR THE CONTROL OF THE AUTOMATIC OPERATION OF A SERIES OF SUCCESSIVE INDIVIDUALLY SELECTED OPERATIONAL STEPS IN BUSINESS, CALCULATING AND SIMILAR MACHINES

Charles H. Gibson, New York, N.Y.
(High Point Lane, Scarsdale, N.Y.)

Filed July 9, 1957, Ser. No. 670,710

15 Claims. (Cl. 197—19)

The invention relates to control devices of machines, such as business machines, calculators, predictors and the like, the operation of which consists of many successive steps, each performed by a mechanism which is individually selected by an operator among a large number of available mechanisms, said control device exercising control by means of a large number of series of preformed electrical connections which are available for selection by the operator. Control devices of this type produce the correct automatic step by step operation of all the single mechanisms performing a series of operational steps of a business or similar machine, which operation is now performed manually by an operator; the activity of the operator may thus be limited to the proper selection of a series of preformed controlling circuit connections which govern the successive operation of the single mechanisms of the machine.

Control devices of this type, each of which provides the business, calculating or other machine with a preformed control circuit for every single one of the successive steps to be performed in the course of operation, and each of which contains a combination of preformed controlling circuits for every desired combination of steps to be performed by the said business, calculating or other machine, or means for producing such a combination have been occasionally proposed for certain activities. However, the size and bulk of the control device, and its complication, expressing itself in costs of production, are usually strictly limited. This is especially true of business machines which have a limted field of action, and with which production costs must be strictly in proportion to the saving, of effort and labor they permit to obtain.

The invention materially improves this type of operator or control device. The invention is particularly useful in connection with automatic legend or word writing typewriters, such as described in my earlier application, Ser. No. 498,842, filed April 4, 1955, which has matured into U.S. Patent No. 2,842,244. However, my present invention has a much broader field of application and may practically be used in many other fields, such as telephony, record or file card selection systems, and in other fields where a selected, desired step-by-step operation comprising a large number of steps, each of which must be individually selected, is performed.

The invention has the dual object of improving the means permitting a free selection of definite preformed circuit connections for a multistep operation, and of producing a machine operator for controlling typewriters and similar business machines, which is greatly simplified with respect to construction and operation so that the costs of production are materially reduced.

One of the objects of the invention, therefore, consists in the improvement and simplification of the elements or units which provide a large number of preformed circuit connections necessary for the individual selective control of the machine to be automatically operated.

It is generally known that some complex circuit connections, for instance the connections of radio, or television sets, of switchboards, etc., have been made by a process called "printing," although some of the processes designated by this term do not exactly use means similar to the conventional printing means. As this invention is not concerned with the production processes for such circuits, it may only be mentioned that for these purposes sometimes real printing methods are used in which a platen or a similar means actually prints the conductors on an insulating sheet using a conductive solution instead of using ink, as is done in the normal printing process, which solution evaporates, leaving the conductive substance (usually a metallic powder or graphite) on the insulating sheets. Other methods have been developed, also called "printing methods," which involve, however, a selective etching of the conductors out of a metal sheet by means of an etching fluid using protective resists, which prevent the etching of the conductive parts. Another method consists in the selective electrolytic plating or depositing of a metal on an insulating sheet on which certain lines or areas have been made superficially conductive by printing or by spraying, using a silk screen, or by using a photoprinting process. The electro-plating process has also been used for making plated-through holes, a process which is used for making terminal posts connected with the electro-plated circuits, on one side of an insulating sheet while the connection with other circuitry is made on the other side of the sheet by means of wires soldered to said terminal posts.

The circuits which so far have been produced by "printing," plating or etching, always comprises a complete network with all conductors involved and their connections covering one side of an insulating sheet only. The end conductors of the printed, etched, or plated circuitry to be connected with other circuits or with terminals leading to instruments, sources of power, etc., are usually provided either with terminal lugs or with plug-in connections or in some cases, where plated-through holes are used, the connection is made through the insulating sheet with wires soldered to the printed or plated or etched circuits on the other side of the insulating sheet by means of the plated-through hole.

According to one aspect of the invention the method of producing printed, etched or plated circuits is so modified that instead of complete circuits containing all the circuit elements and the complete connections between the circuits, such as now produced, independent series of unconnected conductors are produced by printing, etching or plating on an insulating sheet, provided with means for contacting them successively and further provided with means for connecting conductors of one series of independent conductors with one or more conductors of another series of independent conductors.

Further, according to the invention, a series of such independent conductors may be associated with a traveling wiper arm sweeping from conductor to conductor thus producing a different connection at each step of the wiper arm, contacting one after the other of the series of independent conductors. Further, according to the invention, series of independent conductors are provided on both sides of an insulating sheet, a connection of each conductor of a series printed, etched or plated on one side of the insulating sheet being made with conductors of a series printed, etched or plated on the other side of the insulating sheet or plate.

Further, according to the invention, the independent series of unconnected conductors printed, etched or plated on one side of a sheet may all be so arranged that each conductor of the series may be crossed by all or most conductors of the independent series of unconnected conductors on the other side of the insulating sheet or plate. To produce a connection between a conductor printed, etched or plated on one side of the insulating sheet or plate and one or more conductors printed on the other side of the sheet, rivets are used, driven through the sheet at the crossing points of the conductors, using preferably preformed holes at said crossing points. Each conductor of the series thus may produce a specific connection and each sheet produces a definite series of connections.

It has already been mentioned that the independent conductors printed, etched or plated on an insulating plate may be contacted successively by a traveling wiper contact sliding from conductor to conductor, thus connecting an exterior circuit, power source, meter, etc. alternatively and successively with circuits connected with the independent conductors. This system may be further improved by connecting all the corresponding conductors in a group of such insulated sheets or plates with printed conductors and by using only a single traveling wiper arm for the entire group, said wiper arm traveling over a contact bank, the contacts of which are connected with the interconected conductors. The individual conductors printed on the selected one of the inuslated sheets or plates which contains the proper connections is selected by means of a relay, associated with each such sheet or plate, which controls the connections between the series of printed, etched or plated conductors and outer circuits necessary to complete the operation. The selection and operation of the relay associated with one of the sheets or plates, thus determines which one among the sheets or plates of an entire group of such sheets or plates becomes operative thus selecting one series of connections between circuits among those available, to govern the step-by-step operation. By means of relays associated with each sheet or plate carrying series of conductors connected with each other is a special way, large groups of such sheets may be simultaneously serviced by a single movable contact arm.

It is a further object of the invention to simplify the selecting assembly for the steps to be performed and to materially reduce the number of relays necessary for the selection of the individual steps in the multistep operation to be performed, by dividing the relays into cooperating groups, the relays of one group being each capable of making the connections for more than one step of the multistep operation, while the correct connection among those available upon operation of a relay of the said group is made by another group of relays operating simultaneously. The number of relays is thus only equal to the sum of two multiplication factors instead of being equal to the product of these factors.

While one of the objects of the invention thus consists in simplifying the control devices for business, calculating and similar machines which perform a successive step-by-step operation of various single mechanisms, selected from a large number of said mechanisms, which control devices have to be provided with special circuit connections for each step and with means for proceeding in an orderly manner to bring one connection after the other into operation, a further correlated object of the invention consists in simplifying these control devices to such a degree that the entire assembly of preformed circuit connections necessary for a particular operation to be performed consists only in easily exchangeable card-like sheets or plates, of which either each one individually may be serviced by a traveling contact associated with it or preferably in which a large group containing all the necessary sheets or plates for the desired operation may be serviced by a single traveling contact arm, operative to switch the preformed connections for each step of the operation, in and out for every sheet of the group, only a selected one of the insulating sheets of the assembly being however actually made operative.

It is a further object of the invention to provide control devices for business, calculating and similar machines provided with insulated plates or sheets with printed conductors of the character above described, in which one traveling contact arm moves over a plurality of series of independent conductors printed, etched or plates on the two sides of the insulating sheets or plates, and crossing each other, conductors of independent series on the two sides being connected with each other by rivets, said arm thus producing successively a plurality of different connections determined by the placement of the rivets when traveling over a set of conductors printed, etched or plated on one side of the sheet or plate.

It is a further object of the invention to provide an arrangement in which the wiper arm travels over the conductors, printed, etched or plated on an insulating sheet, such as above described, which conductors are so arranged that they permit the movement of the wiper contact arm through a full circle, thus eliminating the necessity for a return movement of said arm.

It is a further object of the invention to provide means including contact devices of the type above characterized cooperating with a single contact arm, whereby instead of the machine operator described in my earlier application, Ser. No. 498,882, now abandoned, operated by means of a separate keyboard, the typewriter itself may be used as the selecting means for the individual insulating sheet or plate to be used in connection with the word writing typewriter.

In addition to these main objects, numerous other objects will be explained in connection with the detailed specification.

The invention is illustrated diagrammatically in the accompanying drawings, showing several modifications of the insulating plates on which the connections are made, and diagrammatically illustrating the simplified control devices. It is, however, to be understood that the drawings are purely diagrammatical and that it is solely intended to illustrate the principle of the invention and the best mode for applying the principle. These diagrams do not show details of the construction with which the experts skilled in the art are familiar, and modifications of the diagrammatic showing therefore do not necessarily involve a departure from the principle of the invention.

In the following detailed specification, insulating sheets or plates with printed, etched or plated conductor elements, hereinafter termed interconnector sheets, are used as a control element for the automatic operation of the business, calculating or other machine. A large number of such sheets, one for each desired operation, have to be provided, among which one has to be selected in order to control the operation of the machine in any single case. These elements will therefore be described first.

Figure 1:
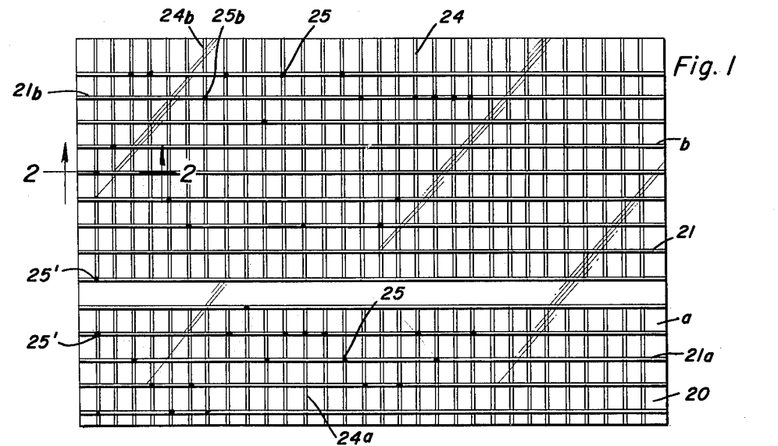
Figure 1 is a view of one of the insulating sheets or plates on which conductors have been printed, etched or plated, the figure showing by way of example an insulating sheet or plate on which a plurality of sets of independent conductors have been printed, etched or plated.
Figure 2:
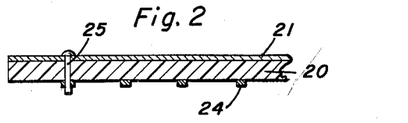
Figure 2 is a sectional view through a portion of the insulating sheet, the section being taken along line 2—2 of Figure 1.
Figure 3:
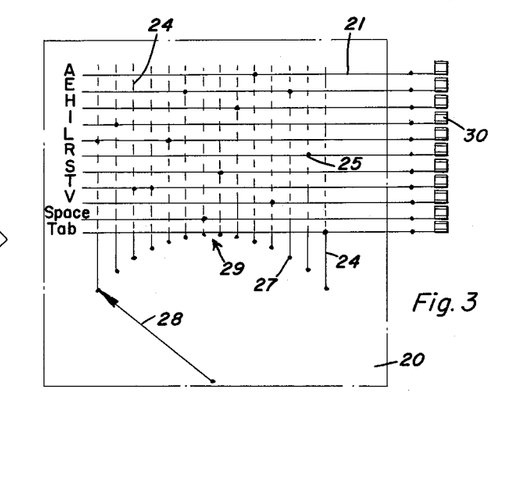
Figure 3 is a diagram illustrating the association of a wiper arm with the insulating sheet carrying a single series of printed, etched or plated conductors.

As shown in Figures 1, 2 and 3, such a control element consists of a sheet or plate 20 made of a resinous plastic or of any other insulating material. In Figure 1 the insulating sheet is shown as being transparent. On one of its surfaces a series of unconnected conductors 21 are printed, etched or plated by one of the processes mentioned above, and in this particular example the conductors on the front side are shown as being parallel and running horizontally from end to end of the plate or sheet 20. On the other side of the sheet a similar set of conductors 24 is arranged shown in Figure 1 as being a set of parallel conductors. This set of conductors is shown as being vertical in Figure 1. It is to be noted, however, as will be seen in other examples, that the geometrical shape and the arrangement and distribution of the conductors is arbitrary and immaterial. They may be curved or straight lines and they may be parallel or converge or diverge as dictated by the various shapes the plates may be given or by the functions which they have to perform. The material point is only that each conductor on one side must cross a number of other conductors on the other side. To produce a connection between conductors on one side and conductors on the other side of the insulating sheet 20 metal rivets 25 may be driven through the sheets at a crossing point for instance at 25 at which the conductor 21 on the front side of the insulating plate 20 crosses conductor 24 on the rear surface of the sheet 20. The rivet thus connects these two conductors. Holes for the rivets may be provided only at the places at which the rivets are inserted. All the rivets may be driven through the sheets. However, where the connections have to be changed or have to be made by the user all crossing points may preferably be provided with small bores for the passage of the rivets.

Rivets with suitable heads may also be used at the end of the conductor to permit the making of wire connections with one of the printed, etched or plated conductors 21 or 24. In some cases terminal lugs or tabs may be provided.

As seen in Figure 1 two groups designated by $a$ and $b$ of independent conductors 21a and 21b are arranged on the front side of the plate 20 and similarly two groups of independent parallel conductors 24a and 24b are arranged on the rear side.

The number of independent groups is, of course, a matter of design, and any number of independent groups may be used.

The above described sheet or plate 20, provided with printed, etched or plated independent conductors on each side, with the conductors on both sides crossing each other and connected by rivets 25 at the appropriate places in order to produce a connection between the two sets of conductors on the two sides of the sheet, may be transformed into a contact device with a traveling contact arm. This may be preferably done in the manner shown in Figure 3, by extending one group of conductors, for instance the conductors 24, and by providing at the end of the conductors rivets 27 which rivets may directly serve as a contact bank 29 for the traveling wiper contact 28, which may be mounted on or near the sheet 20. The wiper contact 28 may travel in a straight line or preferably may perform a circular motion around a center as shown in Figure 3. The contact arm 28 may be driven in any suitable manner, for instance in the manner described in my earlier application, Ser. No. 498,882. The horizontal conductors 21, in this case, are each connected with an operating circuit indicated by a relay 30 in the diagram. These circuits are operated in the desired order, when the arm 28 travels over the contact bank 29, the rivets 27 of which are associated with the conductors 24 shown as vertical in the figure. It will be clear that the order in which the relays are operated depends on the place occupied by the rivets which connect the vertical conductors on the back of the sheet with the horizontal conductors in front of the sheet.

As the sheet 20 may be extended to carry the entire device, including the arm, it will be clear that such a selecting contact device occupies only little space in a transverse direction and that a large number of contact devices may be aligned transversely within a very limited space.

When using a machine operator, as described in my earlier application, Ser. No. 498,882, the device shown in Figure 3 may be used instead of the contact devices which are indicated in Figure 1 of my earlier application at 115, 110—112, and 120—122. The number of vertical and horizontal conductors 21 and 24 will, of course, vary in accordance with the circumstances. In the example illustrated in Figure 3, it is assumed that the device is used for writing a legend or the line of an invoice. In this case the number of conductors is determined by the number of letters or figures used for writing the legend. In the event of a production of such printed interconnector sheets in large numbers, groups with different numbers of contacts may be manufactured, for instance one type containing forty to forty-four conductors corresponding to the alphabetical and numerical keys of a typewriter, one containing only the necessary conductors for writing figures or fractions of figures, and others for writing legends or descriptive words necessitating only a limited number of typewriter key operations.

Figure 3 illustrates the writing of the descriptive item "Little Shavers," which for instance forms part of a line to be placed on an invoice. As seen, only ten horizontal and fourteen vertical conductors are necessary for this purpose, as some of the letters used occur repeatedly.

In addition, an operating circuit for the space key and an operating circuit for the tabulating key which brings the carriage into the proper place for the next item of the invoice, has to be provided.

The operation of the device in detail need not be described as it is the same as that described in my earlier application, Ser. No. 498,882, and it may only be mentioned that upon operation of the keys corresponding to the call number of a desired legend the switch arm 28 starts to move and closes successively the circuits for the typing electromagnets 30 of the electromagnetic typewriter which are connected with the successively contacted conductors 24. The typewriter thus types out the word which has been selected whereupon the operation of the tabulator key brings the carriage of the typewriter into the correct position for the next item of the line, for instance in the position for typing the price or the like.

Figure 4:
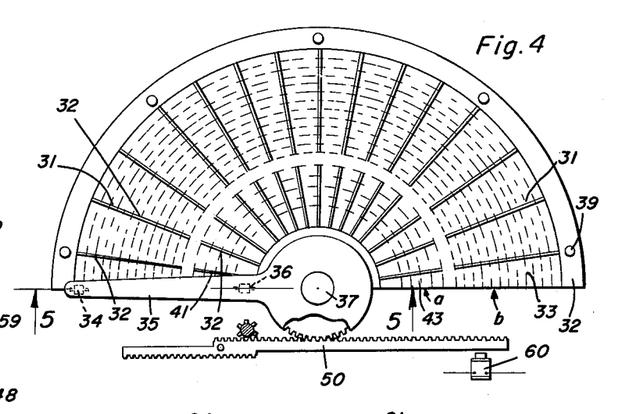
Figure 4 is a diagram illustrating the cooperation of a rotating wiper arm with a semi-circular insulated sheet on which a plurality of sets of radial and of semi-circular conductors have been printed.
Figure 5:
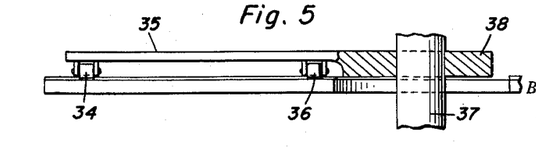
Figure 5 is an elevational sectional view through the wiper arm and the insulating plate or sheet illustrated in Figure 4, the section being taken along line 5—5 of Figure 4.

Figures 4 and 5 show a different way of arranging the conductor on the insulating sheet and also a different way of contacting them. The insulating plate 32, in this case, is of semi-circular shape, and the rotating wiper arm 35 is mounted on a stationary axle or shaft 37, the axis of which passes through the center of the semi-circle formed by the insulated plate. The wiper arm 35 and the mechanism for moving the same and for returning it after it has been moved from one side to the other is indicated at 50 and 60 and is essentially the same as that shown in my earlier application, Ser. No. 498,882. The contacts of the wiper arms are, however, specially adapted to make a direct contact with the printed, etched or plated conductors 31 and 41 on the insulating plate 32, as the printed conductors may be easily damaged or worn off by a wiping contact or by a brush attached to the wiper arm. The arm 35, therefore, as shown in Figure 5, is provided with contact rollers 34, 36 which roll over the conductors on the surface of the insulating plate 32. The two contact rollers 34, 36 cooperate with the two different and independent sets of printed, etched or plated conductors indicated at a and B.

Each set of conductors consists of divergent radially arranged conductors 31, 41, respectively, the number of which corresponds to the number of letters or figures of which the legend or item of the invoice consists. The diagrammatic figures show only a few widely spaced conductors, but actually the spacing corresponds to the number of letters or figures assigned to the legend or invoice item to be typed.

The second set of conductors on the rear side of the plate 32 consist of two sets of semi-circular conductors 33, 43, respectively. The radial conductors 31, 41, arranged on the front side of the insulating plate, are contacted by the contact rollers of the wiper arm near their outer and inner ends, respectively, so that they need not overrun rivets. The semi-circular conductors arranged on the rear side are connected (in a manner not shown in this figure) with the circuits to be controlled.

The two groups a and b, of independent conductors, may either be arranged to serve alternatively or for legends of different lengths. However, it is preferable to use one series for controlling the circuits of the typewriter electromagnets while the other series is used for other controls, either such as indicated in the earlier application or such as described below for controlling a number of operating magnets which is a multiple of the number of controlling conductors.

Holes 39 in the insulating plate 32 are provided in order to attach the said insulating plate to a framework holding a series of these devices in alignment.

As above described, rivets passing through the plates 32 connect each radial conductor 31, 41 with one of the semi-circular conductors 33, 43 and which in their turn are connected with the key lever electromagnets of an electric typewriter.

Figure 6:
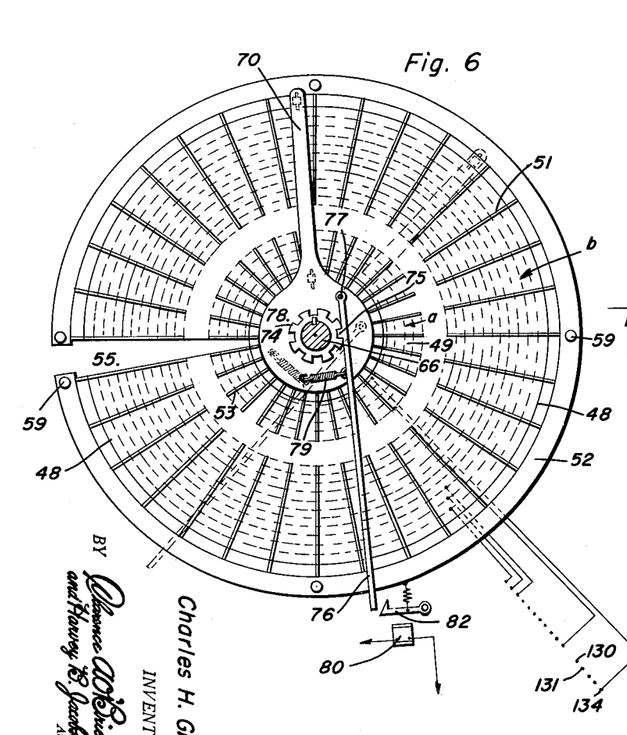
Figure 6 is an elevational view of a circular insulating sheet or plate provided with a plurality of sets of printed, etched or plated conductors cooperating with a wiper arm moving through a full circle.
Figure 7:
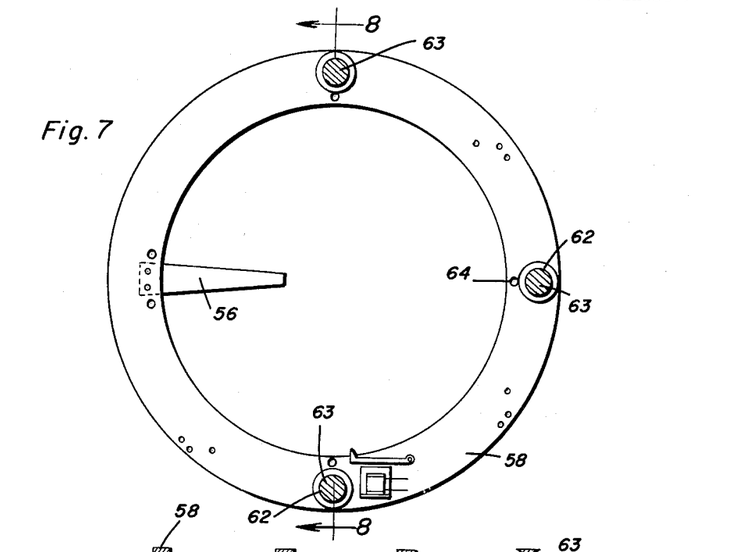
Figure 7 is an elevational partly sectional view through the frame carrying a plurality of such circular insulating plates or sheets.
Figure 8:
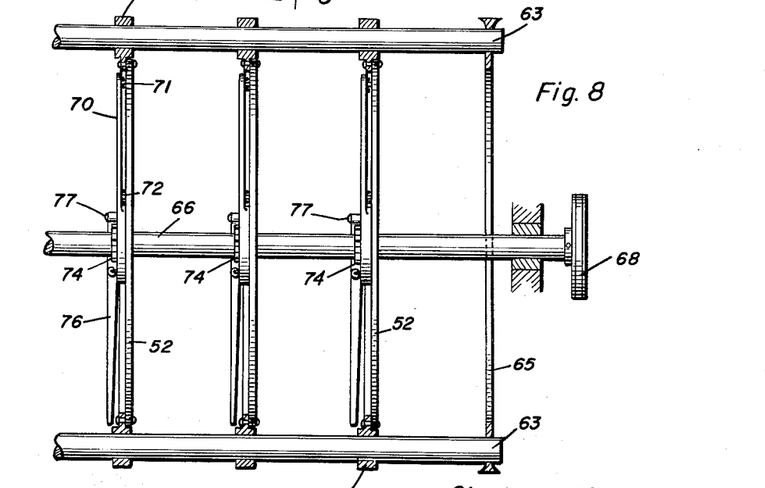
Figure 8 is an elevational partly sectional view of the frame carrying a plurality of circular insulating sheets, the section being taken along line 8—8 of Figure 7.

A further example of an insulating sheet or plate is illustrated in Figures 6, 7 and 8. These figures show a completely circular plate along which the wiper arm may travel continuously through 360° so that no return mechanism need be provided.

The circular insulating plate 52 is again provided with groups of printed, etched or plated radial conductors 51 and 53, respectively, the spacing of which is again much closer than that indicated in the figures. Conductors 51 and 53 form part of independent groups of conductors. More than two independent groups of conductors may be provided.

In the insulating plate 52, a segment 55 may be cut out which cut may be filled by a removable sector plate 56 which may be attached to the circular frame 58 (Fig. 7), on which the circular insulating plate is held. The cut segment permits an easy mounting of the central parts such as the shaft and the attached members. Its most important object, however, is to permit the removal of a single insulated plate for the purpose of exchange or for adjustment without disturbing the entire assembly which may consist of a very large number of such insulating plates.

In such an assembly a large number of insulating interconnector plates 52 are held by means of the annular frame members 58 which are provided with suitable holes 62 through which supporting bars 63 pass, holding the frames in their position. These bars are supported in a chassis, diagrammatically indicated at 65. The annular frames are provided with bores 64 for the bolts or screws holding the insulating plates 52 which are provided with similar holes 59.

The central portion of the insulating plate 52 is cut out and through this central opening a shaft 66 passes which may be driven by some suitable drive means such as the pulley 68. The wiper arms 70 are rotatably seated on said shaft, each being provided with a contact roller 71, 72 for each group of radial and circular conductors 51, 48, 53, and 49, respectively.

The wiper arms 70, operating on the disks 52 of the assembly, are turned by means of a toothed ratchet 74 mounted on and keyed to the shaft 66, which may engage a tooth 75 projecting from a latching lever 76 pivoted at 77 on the hub portion 78 of the wiper arm 70. A spring 79 draws the lever in a direction in which the tooth 75 engages the ratchet wheel or pinion 74. The latching lever 76 projects in a substantially radial direction through the insulating plate 52. Its end may engage a latch 82 which is electromagnetically controlled by means of an electromagnet 80. The latch normally holds the latching lever tooth 75 out of engagement with the ratchet or pinion 74. Upon energization of the electromagnet 80, however, the latch 82 is withdrawn, the latching lever is free to move under the influence of spring 79 which draws the tooth 75 of the lever 76 into engagement with the pinion or ratchet. As the fulcrum of the latching lever is on the hub portion of the wiper arm the latter is moved by the shaft 66 and pinion 79 as long as the wiper turns. After a full revolution the latching lever again engages the latch and the tooth 78 is disengaged from the ratchet or pinion, thus stopping the movement of the wiper arm in a position corresponding to its original position until the energization of the electromagnet again activates the wiper arm.

The use of the above described type of insulating disk with printed, etched or plated conductors, in connection with a rotary selective contact device, permits a much simplified structure of the word writing electric typewriter.

This simplification expresses itself in a reduced size and in a simplified manipulation of the machine operator or other control device for the word writing typewriting assembly.

It will be clear that a word writing mechanism usable for business purposes, say for typing invoices or other business papers, all consisting essentially of names, quantities, descriptions, types, prices and other characteristics of numerous items of merchandise held in stock, requires a large number of interconnector sheets or plates provided with interconnected conductors as each set of conductors on such a sheet or plate can only control the connections writing a single item covering a fraction of the line of an invoice. Further, the arrangement described in my earlier application, Ser. No. 498,882, for automatically typing total prices of a shipment in an invoice whenever the quantity and the unit price of the item have been typed requires again a large number of insulating interconnector sheets or plates with interconnecting conductors. As the average business establishment handles a fairly large selection of goods, each of which must be represented by an interconnector sheet or plate with interconnecting printed conductors, and as likewise the number of unit prices is large it will be clear that according to the system described in my earlier application, each unit or item requires as many interconnector sheets or plates as there are quantities. For an invoice writing machine therefore the number of interconnector sheets or plates is equal to the number of quantities customarily sold in trade, plus the number of goods of different description traded by the establishment, plus the number which is equal to the product of quantities customarily sold, times the number of unit prices associated with the goods sold. The number of interconnector sheets or plates necessary for such a word writing machine is therefore evidently very large and this number is increased by the necessity of furnishing sometimes long descriptive legends which entail the use of more than one interconnector sheet or plate for a single item.

As the number of conductors which may be printed, etched or plates on a given insulated plate area is limited and as also the size of the insulated interconnector sheet or plate is limited, it will be clear that to obtain a control device for a word writing machine of manageable dimensions it is necessary to use selection means which provide a reduction of the number of selector mechanisms and the reduction of the size of the interconnector sheets or plates. Otherwise, the word writing operator mechanism would be of extremely limited applicability.

The size reduction of each interconnector sheet or plate may be obtained by permitting every single conductor of a set to selectively perform a plurality of functions, one of which is selected by a group of relays associated with each interconnector sheet or plate. This materially reduces the size of the said plate.

Figure 9:
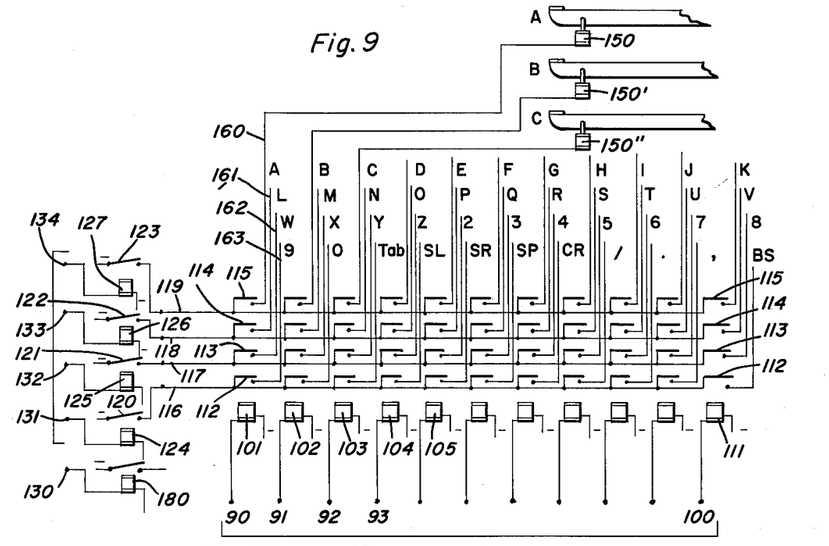
Figure 9 is a diagram of electrical connections illustrating the manner in which every connection on an insulating plate can be used selectively for controlling a plurality of operations.

Such an arrangement in which the size of the interconnector plate is greatly reduced is diagrammatically illustrated in Figure 9.

In this figure each of the contacts symbolized by points marked 90 through 100, represents the connection with one of the printed conductors, for instance with one of the horizontal conductors of the group b in Figure 1. Each of the points marked 130 to 134 represents a connection with one of the horizontal conductors 21 of the second group a. Each of these contacts 90 through 100 is connected with the relays 101 through 111, respectively, having a number of armatures 112, 113, 114, 115, four armatures being indicated. These armatures control contacts connected with the wires 160 to 163 leading to the electromagnets of the electric typewriter which are indicated at 150, 150', 150''.

Corresponding armatures of all relays, indicated by the same reference numerals, are joined by a common conductor 116, 117, 118, 119, respectively, each of which is connected with a source of current marked "—" over one of the armatures 120 to 123, respectively, of a group of four relays 124, 125, 126, 127. The windings of these relays are connected with the contacts 130, 131, 132, 133, 134.

The characters associated with the typewriter keys are marked in the diagram, each character being associated with one of the wires 160, 161, 162, 163, leading to an electromagnet 150 operating the key provided with the character. As will be seen, these characters form four rows A, B, C, D, E . . .; L, M, N, O . . .; W, X, Y, Z . . .; 9, 0, TAB, SL . . . . These characters are also arranged in eleven columns A, L, W, 9; B, M, X, 0; etc. As seen from Figures 1, 4 and 8, and as above explained, the conductors printed on the interconnector plates are divided into two groups marked a and b, in Figure 1, the group a containing only five conductors connected with the five points 130, 131, 132, 133, 134, while the group b contains as many conductors as are necessary for connection with the contact points 90 through 100. The horizontal printed conductors of the group b, will hereinafter be termed printing conductors, while the horizontal conductors of the group a will hereinafter be termed controlling conductors.

The number of printing and controlling conductors depends upon the number of characters and on the way of dividing them into groups which is arbitrary to a certain extent.

It will be clear that if the character L for instance is to be typed, say when the first radial conductor of a circular insulating interconnector disk or the first vertical conductor in Figure 1 is overrun by the wiper arm the rivet 25' connecting the said vertical or radial conductor with a horizontal or circular conductor must be placed on the crossing point with that horizontal or circular conductor which is connected with contact 90, and in the second group a, the rivet must be placed on the conductor connected with the point 133. The wiper arm thus energizes the contact 90 by reaching the first vertical or radial conductor and it therefore also energizes the relays 101 and 126. The energization of the two relays closes one control circuit only, namely, the circuit controlled by the second armature (from above) of relay 101. Only relay 101 was energized in the row 101—111, but although all four armatures 112–115 were closed only the circuit closed by armature 114 receives current over armature 122 of relay 126 which was energized by the wiper arm resting on the radial conductor or vertical conductor which is connected by a rivet with the control conductor leading to the contact 133. With this arrangement an insulating plate need not be larger than necessary to accommodate about fourteen to fifteen conductors.

Figures 10, 12:
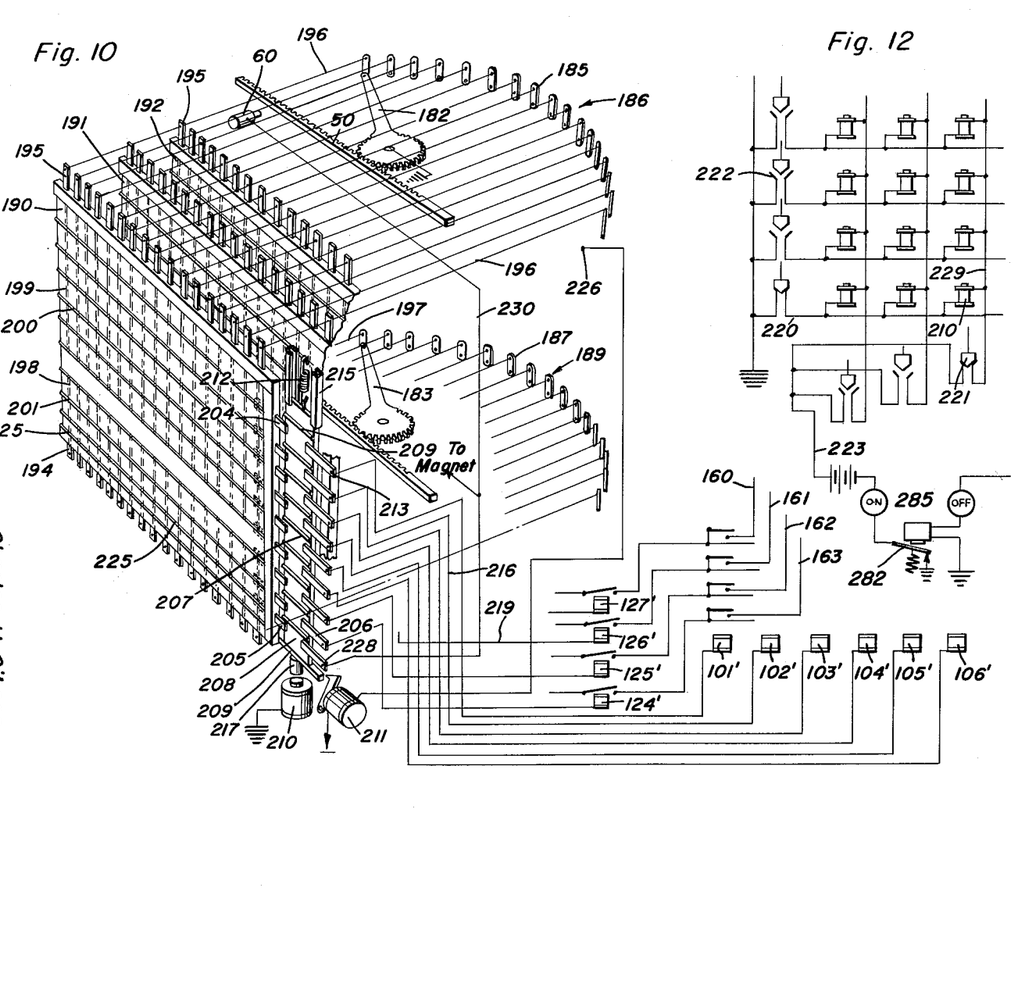
Figure 10 is a perspective diagram illustrating the cooperation of a single conductor arm with a plurality of insulating printed, etched or plated connection control sheets.
Figure 12 is a diagram of connections showing the selection of the connection controlling sheet for a legend by means of the keys of the typewriter writing the legend.

A further marked reduction of the equipment necessary for a word writing operating mechanism may be obtained by using a single wiping arm contactor or selector cooperating with a large number of interconnector sheets or plates which may be provided with sets of printing conductors alone. If a set of printing and a set of control conductors are provided each set is preferably provided with a wiper arm. Figure 10 shows such an arrangement, in which wiper arms 182, 183 are used which may be operated in the manner illustrated in my earlier patent application, Ser. No. 498,882, or which may be moved step-wise in any other manner upon energization of an electromagnet 60. Each wiper arm cooperates with a single set of wiper contacts 185, 187, respectively.

Figure 11:
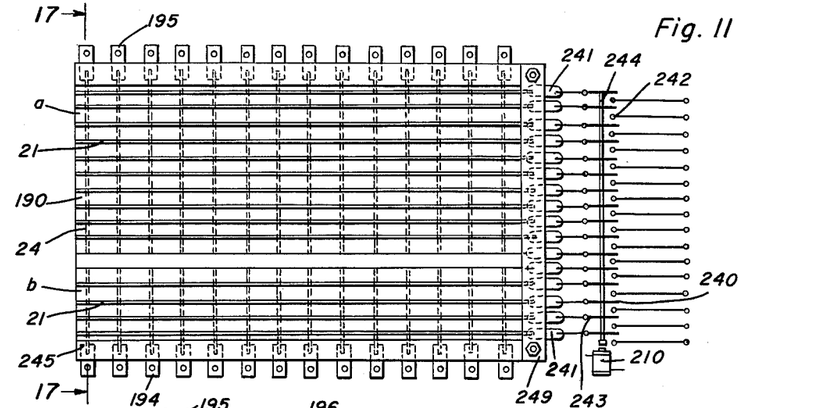
Figure 11 is a diagrammatic front view of one of the insulating plates or sheets on which conductors are printed, etched or plated, said diagram illustrating an insulating plate which is interchangeable, and which cooperates with a large number of similar plates forming a group, serviced by a single wiper contact arm, as illustrated in Figure 10.
Figure 17:
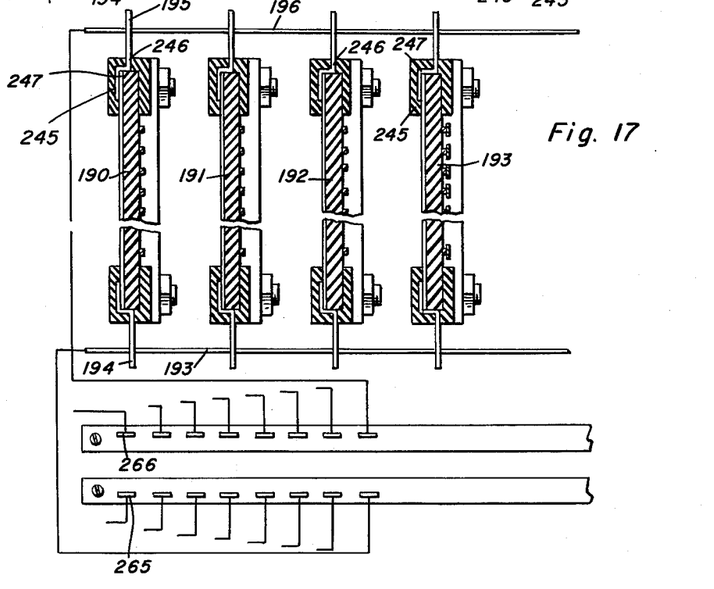
Figure 17 is a diagrammatic view showing the connections between the contacts of the contact bar of the typewriter and the conductors on the insulating connection controlling sheets and their frames, the latter being shown in a section taken along line 17—17 of Figure 11.

A large number of interconnector sheets or plates 190, 191, 192 . . ., each equipped with "vertical" or "radial" spacing conductors and with "horizontal" or "circular" printing and control conductors, respectively, are aligned. The entire group of plates may be held in a frame which is, however, not shown in the diagram of Figure 10, but is illustrated in Figures 11 and 17.

It will be seen in these figures that each interconnector sheet or plate 190 is inserted into a frame 245 which may be open on one end, in order to allow ready insertion or removal of a sheet or plate 190. The frame members are approximately U-shaped in cross section and are made of insulating material. Slots 246 are provided along the frame members, facing the groove or channel of the U-shaped member through which tabs 194, 195 are inserted. The spacing of the slots and tabs corresponds to the spacing of the printed, etched or plated conductors on the interconnector sheets or plates. In order to produce contact between said conductors and the tabs 194, 195 each tab is provided with a tongue 247 which lines the groove or channel of the U-shaped frame member on one side. The conductors on the interconnector sheet or plate thus come into contact with the tongues 247 of the tabs when the said sheet is inserted. To provide good contact the tongues on the frame members may be made of somewhat resilient material.

The rear member 249 of the frame is provided with tabs 241 in the same manner which cooperate with the conductors on the other side of the interconnector sheet or plate inserted into the frame.

The number of interconnector sheets or plates assembled for controlling the word typing mechanism is not limited, except by practical consideration and by the fact that a suitable selection method must be applicable. The group may, however, in many cases contain all the interconnector sheets or plates for all the legends, descriptive items, figures and other items to be written by the word writing machine.

Preferably the sheets or plates 190, 191 . . . of a group, are so aligned that the vertical (or radial) conductors 198, 199 are all aligned and their tabs 194, 195 are therefore also aligned. Wires 196, 197 connect the aligned tabs 194, 195 respectively of all the interconnector plates or sheets 190, 191 . . . with one of the wiper contacts 185, 187 respectively on the wiper contact bank 186, 189 respectively. The horizontal "printing" conductors 200 and "controlling" conductors 201 are connected with the tabs 204 and 205, respectively. These tabs may be secured in the frame holding the interconnector plate and may extend beyond the frame, forming relay contacts. Alternatively, as shown in Figure 11, the extension may directly be connected with one of the armatures of the multiple relay armature 244. In the arrangement shown in Figure 10, diagrammatically, contacts 206, 213 are aligned with the extensions of the tabs 204, 205, respectively, with the contacts 206 being fixedly held on a stationary strip which is shown as being broken off in the figure for the sake of clearness. The strip is attached to the frame or is otherwise fixedly held. It will be understood that the two contact elements 205, 206 or 204, 213 form a pair of contacts separated by a gap. Behind said gap a strip-like plate 208, of insulating material, is held carrying on its front strip-like contact elements 207, 209 which project from the plate to such an extent that they are located in the same plane with the contact pairs 205, 206 and 204, 213. The strip-like contact elements 207, 209 are so arranged that upon movement of the strip-like plates to one position the strip-like contact elements 207 bridge the gap between the pairs of contacts 205 and 206 and the contact elements 209 bridge the contacts 204, 213 so as to connect these contacts, while in another position the strip-like contacts are removed from the gap and interrupt the connection between the pairs of contacts 205, 206; 204, 213.

The strip-like insulated plate is moved by the relay armature 217 of a relay 210 which, when energized, brings the plate into the position in which the bridging elements 207, 209 contact both contacts of the pair 205, 206 or 204, 213. In this position the strip may be locked by a locking relay 211. The spring 212 tries to pull the strip-like plate 208 into the position in which the contact elements 207, 209 are not operative.

The strip-like plate 208 may be guided by means of guides 215, only the upper guides being shown in the diagram.

Alternatively, as shown in Figure 11, each of the tabs 241 may be connected with one of the contact arms of the multi-contact relay 210. This relay may have the shape of a so-called telephone relay, the armature 244 of which is provided with a large number of armature contacts 240 cooperating with fixed contacts 242, all the armature contacts being moved at the same time.

The corresponding contacts 206, 213 (Figure 10) or 242 (Figure 11) of all interconnector sheets or plates 190, 191, 192 forming the assembly may be aligned and interconnected by means of conductors not shown. Conductors 216 connected with corresponding "printing" conductors of all interconnector sheets lead to relays 101', 102' which correspond exactly to the relays 101 through 111 of Figure 9. Likewise, the conductors 219 of corresponding controlling conductors are connected with the relays 124', 125' . . . corresponding to the relays 124 through 127 of Figure 9. Therefore, the electric typewriter will be operated by these relays exactly in the manner described in connection with Figure 9, as soon as the energizing circuits for these relays are completed. The energizing circuits for relays 101', 102' . . . and 124', 125' . . . are closed by the wiper arms 182, 183. While the wiper arms cooperate with an assembly of numerous interconnector sheets or plates, obviously only one of said interconnector sheets or plates of the set will be operative, namely, the one which has been selected, the selection being performed by energizing the relay 210. The energization of the relay 210 may be controlled in the manner already described in my earlier application, Ser. No. 498,882, which is illustrated in Figure 1 of said earlier application. It is also schematically illustrated in Figure 12. The relay magnets 210 are again connected in columns and rows by means of conductors 229, 220, respectively, each conductor being controlled by a selector switch 221, 222, respectively. The selection is made by the operator who closes a combination of these switches, thus selecting one of the interconnector plates. The combination of switches for each legend must be found in a list of legends or item descriptions, etc.

The operation of a device embodying this assembly is thus essentially the same as that described in my earlier application.

The assembly shown in Figure 10 is mainly used for controlling the writing of legends or item descriptions with a large number of characters. As soon as an interconnector sheet or plate has been selected by depressing a combination of switches 220, 221, energizing one of the relay magnets 210, the relay magnet attracts its armature which moves the bridge contact strip 208 to an operative position. In this position the strip and armature is locked by the locking relay 211. When this position has been reached all the contacts 205, 204 are connected with contacts 206, 213 respectively by the bridge contacts 207, 209.

One of the control conductors 225, by means of the tab contacts 228 closes the circuit 230 of magnets 60 of the wiper contact switches. The circuit of magnets 60 may, of course, be closed either by hand, as shown for instance in Figure 1 of my earlier application, or may have been closed by the switch of an assembly, the operation of which precedes that of the assembly here described.

The wiper contact arms 182, 183 now start to move from contact to contact of the contact banks 186, 189, every contact 185, 187 of these contact banks being connected with the tabs of one vertical or spacing conductor of all the interconnector sheets or plates. However, only one interconnector sheet or plate, for instance the plate 190 is operative. This is the plate whose relay 210 has been operated as above described, while all other plates 191, 192 . . . remain inoperative.

The operation now proceeds much in the manner already described in my earlier application, Ser. No. 498,882, and as described previously in connection with Figure 9, the wiper arms moving from contact to contact until the last contact of the contact bank 186 has been reached.

During this phase the interconnected printing conductors energize the relays of the groups 101' through 111', and the relays 124' through 127', indicated in the diagram which correspond to relays 101—111 of Figure 9 and which operate the typewriter electromagnets as has been described in connection with Figure 9. Finally, the last contact of the bank 186 is reached, which closes the circuit 226 of the locking relay 211. The relay 211 then releases the armature so that the bridge contact strip 208 returns to its original inoperative position.

The operation of this unit is now at an end, but the wiring may be similar to that shown in Figure 1 of my earlier application, Ser. No. 498,882, according to which the operation may continue in another group which is now made operative. The assembly of interconnector sheets or plates above described simplifies the operation and reduces the space necessary to such an extent that a basic simplification of the legend or word writing control mechanism for an electric typewriter may take place. This simplified arrangement dispenses with a separate selector switchboard using the keyboard of the electric typewriter which, in addition to its main function of legend or word writing, performs the additional function of a selector switchboard. Further, the control of the orderly sequence of all typewriter operation may be performed by the typewriter itself.

The standard electric typewriter necessary for producing automatic word writing or legend writing receives only minor additional equipment for the purpose above stated. Its control is exercised by the controlling equipment, which has been above described.

Figures 13, 14, 15, 16:
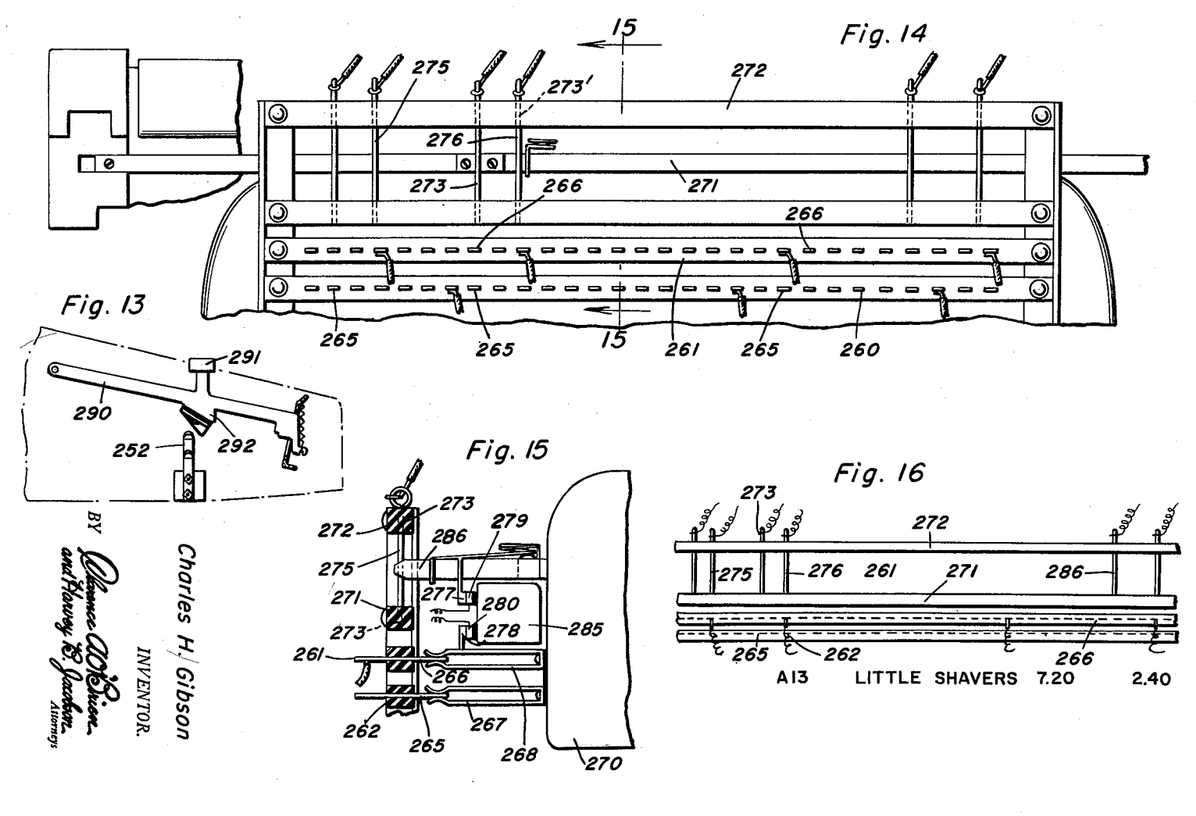
Figure 13 is a fragmentary elevational view of a typewriter key, showing the control contact associated with each typewriter key when performing a selection.
Figure 14 is a fragmentary rear view of an electric typewriter provided with contact bars and with bars for inserting contact pins.
Figure 15 is an elevational fragmentary sectional rear view of the typewriter the section being taken along line 15—15 of Figure 14.
Figure 16 is a fragmentary elevational view of the parts added to the rear portion of an electric typewriter, said figure illustrating the connection between the spaced contacts and the pin contacts in connection with words forming one line of an invoice.

As seen in Figure 13, each key lever 290 of an electric typewriter carrying a key 291 is provided with a projection 292 or with another device adapted to close a contact switch 252 upon depression. The contact switch shown is identical with one of the switches 221, 222 shown in Figure 12. For the sake of simplicity of the explanation, it is assumed that the number of legends to be selected does not exceed a few hundred, so that legend selection by the depression of a combination of keys, as above described, is possible. A device for selecting a large number of legends entails further additions which, however, do not form the subject matter of this application.

In addition to the keys provided with key switches, 252, 292 the standard electric typewriter is provided with two bars 260, 261 (Figures 14, 15, 16) of insulating material running along the entire length of the typewriter at the back thereof, in substantial parallelism with the carriage. On these insulated bars 260, 261 as many contacts 265, 266 are arranged as there are spaces along the line, each series of contacts 265, 266 being so spaced that sliding contacts 267, 268 on the carriage 270 (Figure 15) will be in operative contact with the said series of contacts 265 and 266, in each position of the carriage when the latter is moved along the line. In addition, two further bars of insulating material 271, 272 are arranged which are likewise running along the entire length of the typewriter at the back thereof, and into which vertical holes 273' have been bored preferably spaced like the contacts 265, 266, the holes in the two bars being aligned for the purpose of being able to insert, at certain places, selected by the operator, contact pins 275. The carriage 270 is provided with a leaf spring contact brush 286 which produces a contact with the contact pins 275 at the places which have been selected by the operator.

The current supply to the springs 267, 268 and to the leaf spring contact 276 is obtained by means of small brushes 277, 278, sliding on conductors 279, 280, each of which is connected to a source of power. The conductors are mounted on insulating strips which run along the rear member 285 of the electric typewriter.

The construction indicated in the drawings diagrammatically shows that all the parts may be mounted on a standard electric typewriter, but it will be clear to the expert that a special typewriter may be constructed embodying the above features.

As above stated, the fifty-two keys of the standard electric typewriter may be used in the same way in which the forty-eight push buttons of the switchboard described in my earlier application, Ser. No. 498,882, and illustrated in Figure 2 of the said earlier application, are used. However, a separate switch 282 for switching the word writing mechanism on and off is preferably provided in addition. The switches associated with the keys of the typewriter do not play any part which is different from the part played by the switchboard switches in my earlier application above mentioned.

In the simplest form of the device, according to the invention, the typewriter cooperates with an assembly such as shown in Figures 9 to 12, said cooperation being diagrammatically illustrated in Figure 16. The switch 282 is preferably connected with the on and off switch 285 of the legend writing assembly. An electrical connection may be provided permitting the switch 282 to be closed only when the "off" switch is open. This switch cuts in the circuits of the key switches 221, 222 when the typewriter is operated manually for selecting the legends to be typed out automatically, meanwhile keeping any automatic operation from proceeding.

The electric typewriter may cooperate with an assembly such as shown in Figure 10. Each of the tabs 195 in contact with a "vertical" or "radial" printing conductor of an interconnector sheet or plate 190, 191 . . . is now connected with one of the contacts of the series 265, and each of the interconnected tabs 194 joined by conductor 193, in contact with a "vertical" or "radial" controlling conductor of the interconnector sheet or plate, is connected with one of the contacts of the contact series 266. This connection is made in such a way that starting from the left side of the interconnector plates 190, for instance, the conductors joining the first tabs 195 or 194 are also connected to the first contacts of the series 266, 265, respectively, at the left. The conductors joining the second tabs are connected to the second contacts of the series, etc.

The contact pins 275 are connected with the tabulator key electromagnets of the typewriter, these connections being, however, not shown separately.

For the sake of simplicity the means for producing a continuous operation of a number of successive legends is not illustrated.

In Figures 10–16, the operation described therefore assumes that if a number of separate legends has to be typed, each legend is separately selected and then typed on the electric typewriter.

The operator, if a number of legends have to be written on the same line, first inserts the pins 275 at the proper space at which each of the separate legends starts and ends, and he further sets the tabulator of the typewriter so as to start the writing of each legend at the proper corresponding place.

Under the above simplifying assumption that the writing of each legend is started separately by the operator, the operator first presses the button of switch 285 in order to be able to select the legend. This connects the source of current with line 223. By depressing of those keys of the typewriter which correspond to the key number of the legend, the legend to be written is selected. It may be assumed that the key number is X9. The operator then depresses key X and key 9 of the typewriter. The depression of the two keys X and 9 when switch 285 is closed operates the magnet 210 of one and only one interconnector sheet or plate 190 on which the proper connections for this particular legend have been preformed.

Let it now be assumed that the legend starts at spaced contacts of the series 265, 266 below pin 273. This is the eighth contact of the series and the eighth tab 195 and the eighth tab 194 are connected with the eighth contact of the series 266 and 265. Upon pressing the "on"

button 285, the electromagnet 210 of the interconnector sheet or plate 190 wired for this legend is energized and the automatic operation now starts in the manner already described, the typewriter shifting from space to space in the well known manner under the influence of the carriage moving spring, the current being supplied by the brushes 277 and 278.

If it is assumed, for the sake of simplification, that the legend starts at the eighth contact it will be seen that the wiper arm, which always starts at the first contact, does not make any connection as no current is supplied until the eighth contact 265 is reached. From then on current being supplied over the contacts 267, 262 and 268, 266, to the printing conductors and the control conductors, respectively, the typing of the legend in the manner already described proceeds by the energization of the relays 101—111 connected with the printing conductors and of the relays 124—127 connected with the controlling conductors. This operation is identical with the operation already described in connection with Figure 10.

The typing proceeds, the carriage moving from contact to contact until the pin 276 is contacted at the end of the legend. This cuts off the current supply from contacts 262 and 266 and also operates the tabulator key magnet operating the tabulator of the electric typewriter which shifts the carriage into position for typing the next legend.

It will thus be seen that the invention is a marked improvement on known machine operators transforming the machine operator into a business machine of many uses on account of the fact that electrical connections are now performed by means which are closely similar to punch cards. The connections on the interconnector sheets or plates may be prepared for individual cases without much cost, and the sheet or plate may be interchanged by unskilled workers if held in suitable frames such as described permitting such interchange. With the construction shown in Figures 12 to 17, it is possible to interchange the plates freely so that each electric typewriter in a business can be equipped with a special assortment permitting it to perform any special job.

The operator's activity is thus reduced to a simple manipulation of selecting a key number or a plurality of such key numbers for each job to be performed.

The system of making definite series of connections is not confined to business machines, as already mentioned, and may be employed wherever an automatic operation involves the successive making of a large number of preset connections.

It will be clear that the application of the principle of the invention will vary, and that the expert skilled in this art will be able to make many changes and adaptations without in any way departing from the essence of the invention as defined in the annexed claims.

What is claimed as new is as follows:

1. An electric control system for automatically controlling the stepwise operation of operating circuits servicing an apparatus, the operational steps of which are selectable by means of preformed connections, comprising a group of insulating sheets each provided with independent series of unconnected printed conductors, one series being printed on one side of the sheet and another series being printed on the other side of the sheet with the conductors on the two opposite sides of the sheet crossing each other, connection means piercing the sheet inserted at selected crossing points of the printed conductors on the two sides of the insulating sheet produce a connection between printed conductors on different sides of the insulating sheet, means for making connections between printed conductors of a series and operating apparatus that is to be controlled, a movable contact arm adapted to move automatically from one contact position to another contact position, thus producing operative connection of the contact arm with the printed conductors of a series on one side of the insulating sheet in each position of the contact arm, a relay controlling the connection between printed conductors of a series and operating apparatus circuit to be controlled, associated with each insulating sheet, and manually controlled energizing circuits for said relays, the manual control operating a relay associated with an insulating sheet provided with preformed connections between printed conductors, thus selecting one preformed connection out of a group of such connections.

2. An electric control system controlling the step by step operation of a number of different freely selectable operating circuits of a controlled apparatus comprising a group of insulating interconnector sheets each sheet provided with independent series of unconnected printed conductors, conductors printed on one side of the insulating interconnector sheet crossing the conductors printed on the other side of the said sheet, sheet piercing interconnecting conducting means inserted at preselected crossing points of conductors, producing a connection between conductors on opposite sides of the insulating interconnector sheet, a traveling contact arm successively connected with a series of conductors on one side of the interconnector sheet, means for connecting each printed conductor on the other side of the interconnector sheet with a control circuit controlling the operating apparatus circuits, the latter being closed upon connection of the aforesaid connecting means with a printed conductor which, for the time being, is connected with the traveling contact arm, and a control relay for controlling the means for connecting each printed conductor on one side of the interconnector sheet with the controlled circuit.

3. An electric control system as claimed in claim 2, wherein the means for connecting each printed conductor on one side of the interconnector sheet with a control circuit, include a relay armature of the control relay, the relay armatures of all printed conductors on one side of a sheet being controlled in common by the said control relay.

4. An electric control system as claimed in claim 2, wherein each insulating interconnector sheet is held in a frame consisting of grooved frame members, the grooves of the frame members receiving the insulating interconnector sheets, the frame being provided with tabs having upstanding outwardly projecting portions for outer connections and with inwardly projecting tongues for contact with the independent and unconnected printed conductors on both sides of the insulating interconnector sheet.

5. A control system as claimed in claim 4, wherein the frame is open on one side for interchanging the insulating interconnector sheet, and for connecting different interconnector sheets with a fixed system of outer connections.

6. A control system for controlling selectively the successive operation of a number of energizing circuits selected from a group of such circuits servicing an apparatus, comprising insulating interconnector sheets with independent groups of unconnected printed conductors on its two sides, the groups of printed conductors on one side crossing the printed conductors on the other side, interconnecting sheet piercing contact means connecting conductors crossing each other at selected crossing points, the printed conductors on one side of the interconnector sheet being connected with a plurality of groups of selector relays, each relay of each group having an energizing relay circuit, one group of selector relays consisting of relays with a plurality of armatures, each armature controlling an energizing circuit of an electromagnet producing the desired selective operation, corresponding armatures of all relays of the last named group being joined by a common connection forming part of said energizing circuit, a further group of relays connected with printed conductors forming an armature selecting group for the first named relay group, the relays of said further group being provided with armatures each controlling the connection of a source of power with the common connection of all corresponding armatures of the first named group of relays, the number of relays controlling the controlled energizing circuits being thus a fraction of the number of circuits controlled, means for producing a step by step energizing of the selected energized circuits, said means including a traveling arm successively making connection with conductors on one side of the interconnector sheet, said arm completing the energizing relay circuits of the selector relays, and thus successively closing the energizing circuits controlled by said selector relays.

7. A control system as claimed in claim 6, wherein each insulating interconnector sheet is provided with a plurality of groups of printed unconnected conductors on each side of the sheet, said groups being independent and so arranged that for each group of unconnected conductors on one side of the interconnector sheet a similar group of unconnected conductors is provided on the other side of the interconnector sheet, the conductors of the two last named groups crossing each other, a separate traveling contact making means for each group of printed conductors arranged on one side of the interconnector sheet, said separate contact making means traveling in conjunction, making simultaneous connection with printed conductors in the groups, means for making connections between one group of conductors on one side of an interconnector sheet with one group of selector relays, and means for making connection with another group of printed conductors on the same side of the interconnector sheet and with the armature selecting a further group of relays.

8. A control system for controlling the successive operation of specific energizing circuits selected from a group of such circuits servicing an apparatus, comprising a group of insulating interconnector sheets, each interconnector sheet of said group being provided with sets of unconnected printed conductors on both sides, a set of unconnected printed conductors on one side of the sheet crossing a corresponding set of unconnected printed conductors on the other side of the sheet, conducting sheet piercing members being inserted at selected points connecting preselected conductors on one side of the interconnector sheet with preselected conductors on the other side of the interconnector sheet, common connections joining corresponding printed conductors of one side of all interconnector sheets of the group, contacts associated with said common connections, a traveling wiper arm moving over the said contacts, means for driving said arm, the printed conductors on the other side of the interconnector sheets being connected with control circuits, a relay for each interconnector sheet having a number of armatures, said armatures controlling the connection of the last named printed conductors with the said control circuits, an energizing circuit for each of said relays associated with an interconnector sheet, said circuit being controlled by manually operated selector switches, selector relays controlled by said control circuits said selector relays controlling the specific apparatus servicing energizing circuits controlled by the system, the selection of the specific energizing circuits successively operated being thus performed by the selection of the interconnector sheet of the group which becomes operative by manual operation of the selector switches.

9. A control system as claimed in claim 8, wherein one set of printed conductors on each interconnector sheet of the group is connected with selector relays, each having a plurality of armatures, each armature controlling a specific apparatus servicing energizing circuit and all corresponding armatures of all the selector relays being connected with each other by common connections, and wherein a further independent set of printed conductors is connected with the energizing circuits of armature selector relays, each of said relays completing the circuit of the common connections of all corresponding armatures of the selector relays, the completed circuits completing the specific apparatus servicing energizing circuit.

10. A control system for word or legend writing typewriters, each typewriter being provided with key levers operable manually and electromagnetically, each key lever being provided with an electromagnet operating the key lever upon energization, comprising a group of selector relays, each having an energizing circuit, each selector relay controlling a typewriter electromagnet, a group of insulating interconnector sheets, each interconnector sheet being provided with a set of unconnected printed conductors, on each side of the sheet, the sets of unconnected printed conductors on both sides of the interconnector sheet crossing each other, sheet piercing conducting means inserted at preselected crossing points, means for connecting the printed conductors of one side of the interconnector sheets of the group with the selector relays, means for producing a successive operation of different selector relays, including a contact arm successively making connection with the printed conductors on the other side of the sheet, said contact arm being connected with a branch of the energizing circuit of the selector relays, and a legend selecting means consisting of a special key switch associated with each typewriter key and operated by manually operating the key.

11. A control system as claimed in claim 10, wherein the legend selector means consists of a group of legend selector relays, each controlling the connections between an interconnector sheet and the selector relays, arranged in columns and rows with energizing circuit branches common to each column of the relays and energizing circuit branches common to each row of relays, and wherein a number of key switches operated by the key levers complete the circuit branches of the rows, and a further number of key switches complete the circuit branches connected with the columns, the operation of two key switches completing the circuit of a legend selector relay, said legend selector relay selecting one interconnector sheet from the group of such sheets by connecting its printed conductors of one side with the selector relays.

12. A control system for word and legend typewriters with key levers operable manually and electromagnetically, comprising an operating electromagnet for each key lever, a legend selector switch for each key lever, an insulating member with a contact for each space, contacts connected with a power supply circuit for contacting successively each contact on the insulating member, one of said contacts being fixed and the other mounted on the carriage, a group of interconnector sheets, each interconnector sheet consisting of an insulating sheet with groups of unconnected conductors printed on each side, the conductors printed on one side crossing those printed on the other side, conducting members piercing the sheet at crossing points to produce a connection between selected conductors on both sides of the interconnector sheet, connections between contacts on the carriage carried members and corresponding conductors on a group of interconnector sheets, and means connected with conductors on the interconnector sheet for operating an electromagnet of the typewriter.

13. A control system as claimed in claim 10, having two series of contacts for each space and sliding contacts for contacting the spaced contacts during the movement of the carriage, each contact of a first series of the above mentioned spaced contacts being connected with conductors, connecting corresponding printed conductors on one side of the interconnector sheet and the contacts of a second series of spaced contacts being connected to the conductors connecting printed conductors on the other side of the interconnector sheet.

14. A control system as claimed in claim 10, wherein removable pin contacts are inserted at selected spaces in alignment with the space contacts, and contact means contacting said pin contacts, said pin contacts being connected with tabulator keys of the typewriter.

15. A system for successively making a number of preformed connections, comprising an insulating sheet, a series if independent printed conductors unconnected with each other on each side of said sheet, conductors of a series on one side of the sheet crossing a plurality of conductors of the series on the other side of the sheet, a sheet piercing interconnection pin inserted at selected crossing points connecting a conductor on one side of the sheet with another conductor on the other side of the sheet, traveling contact means successively making connections with the conductors of a series of conductors on one side of the insulating sheet, said insulating sheet being a circular disk with the printed conductors on one side of said disk arranged radially and the printed conductors on the other side of the disk arranged in concentric circles, said traveling contact means being rotatable around the center of the circle and being arranged on the side of the insulating sheet on which the radially arranged printed conductors are located, driving means for moving said traveling contact means through a full circle, a contact roller on the traveling contact means making direct contact with the radially disposed printed conductors, and means for arresting said traveling contact means in a definite starting position and for releasing the traveling contact means from this position, said driving means comprising a drive shaft in the center of the circular disk, said traveling contact means being mounted for free rotational movement around said drive shaft, a driving disk on said drive shaft provided with notches, a drive rod fulcrumed on said freely rotatable traveling contact means provided with a drive tooth adapted to engage a notch in the driving disk, means to draw the drive rod and drive tooth towards the notch to produce engagement of the rod fulcrumed on the traveling contact means and a notch in the disk, such engagement coupling the traveling contact means with the rotating shaft, an electromagnetically controlled latch, said latch engaging the drive rod and disengaging its tooth from the drive disk in a predetermined starting and zero position of the traveling contact means, a controlling electromagnet, said latch being disengaged from the rod momentarily by the controlling electromagnet when energized, thus producing engagement of the drive rod tooth with the drive disk notch and coupling of the traveling contact means with the shaft for a full rotation after completion of which the drive rod again engages the latch, thus stopping the traveling contact means in a predetermined starting position.

References Cited in the file of this patent

UNITED STATES PATENTS

| | | |
|---|---|---|
| 1,688,631 | Hubbel | Oct. 23, 1928 |
| 2,616,994 | Luhn | Nov. 4, 1952 |
| 2,634,310 | Eisler | Apr. 7, 1953 |
| 2,649,513 | Luhn | Aug. 18, 1953 |
| 2,820,126 | Murray | Jan. 14, 1958 |
| 2,842,244 | Gibson | July 8, 1958 |
| 2,872,391 | Hauser et al. | Feb. 3, 1959 |